United States Patent
Bialzak et al.

(10) Patent No.: US 11,687,892 B1
(45) Date of Patent: *Jun. 27, 2023

(54) STATUS INFORMATION FOR FINANCIAL TRANSACTIONS

(71) Applicant: Wells Fargo Bank, N.A., San Francisco, CA (US)

(72) Inventors: David Bialzak, Des Moines, IA (US); Darren James Dobier, Stillwater, MN (US); Kevin Chu, Philadelphia, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/459,249

(22) Filed: Aug. 27, 2021

Related U.S. Application Data

(62) Division of application No. 14/864,133, filed on Sep. 24, 2015, now Pat. No. 11,126,978.

(60) Provisional application No. 62/129,123, filed on Mar. 6, 2015.

(51) Int. Cl.
*G06Q 20/10* (2012.01)
*G06Q 20/02* (2012.01)
*G06Q 20/40* (2012.01)
*G06Q 50/16* (2012.01)

(52) U.S. Cl.
CPC .............. *G06Q 20/10* (2013.01); *G06Q 20/02* (2013.01); *G06Q 20/40* (2013.01); *G06Q 50/16* (2013.01)

(58) Field of Classification Search
CPC .............................. G06Q 40/00; G06Q 20/00
USPC ................................................... 705/36 R, 38
See application file for complete search history.

(56) References Cited

U.S. PATENT DOCUMENTS

| | | | |
|---|---|---|---|
| 6,088,686 A * | 7/2000 | Walker ............... | G06Q 40/025 235/383 |
| 7,315,841 B1 | 1/2008 | Mcdonald et al. | |
| 7,379,912 B1 * | 5/2008 | Camin ................ | G06Q 40/00 705/38 |
| 7,640,209 B1 * | 12/2009 | Brooks ............... | G06Q 40/025 705/38 |
| 7,653,592 B1 * | 1/2010 | Flaxman ............. | G06Q 40/02 705/37 |
| 7,860,781 B1 * | 12/2010 | Bodi .................. | G06Q 40/025 705/38 |

(Continued)

OTHER PUBLICATIONS

Resources for Real Estate Professionals, "My QL Agent Insight", https://realestateagent.quickenloans.com/, Copyright 2000-2015 Quicken Loans Inc., 4 pages.

(Continued)

*Primary Examiner* — Kirsten S Apple
(74) *Attorney, Agent, or Firm* — Merchant & Gould P.C.

(57) ABSTRACT

An electronic computing device receives a request from a third party for status information for a financial transaction. The request includes an identifier for the third party and an identifier for the financial transaction. The third party is authenticated using the identifier for the third party. A data store is queried using the identifier for the financial transaction to determine the status information for the financial transaction. Any contingency information associated with the financial transaction is updated. The status information and contingency information are returned to the third party.

20 Claims, 8 Drawing Sheets

(56) References Cited

U.S. PATENT DOCUMENTS

| | | | | |
|---|---|---|---|---|
| 8,185,466 B2* | 5/2012 | Martinez | G06Q 40/00 | 705/37 |
| 8,433,650 B1* | 4/2013 | Thomas | G06Q 40/02 | 705/38 |
| 8,626,644 B2* | 1/2014 | Greig, Jr. | G06Q 40/025 | 235/375 |
| 2002/0059137 A1* | 5/2002 | Freeman | G06Q 30/06 | 705/38 |
| 2002/0069160 A1* | 6/2002 | Olin | G06Q 40/06 | 705/36 R |
| 2002/0091621 A1* | 7/2002 | Conklin | G06Q 40/04 | 705/37 |
| 2003/0009409 A1* | 1/2003 | Horner | G06Q 40/02 | 705/36 R |
| 2003/0144950 A1* | 7/2003 | O'Brien | G06Q 40/02 | 705/38 |
| 2003/0220806 A1* | 11/2003 | Hoffman | G06Q 30/06 | 705/348 |
| 2004/0064402 A1* | 4/2004 | Dreyer | G06Q 40/025 | 705/38 |
| 2004/0220820 A1 | 11/2004 | Brush et al. | | |
| 2004/0230521 A1* | 11/2004 | Broadbent | G06Q 40/025 | 705/38 |
| 2005/0049961 A1* | 3/2005 | Hansen | G06Q 40/025 | 705/38 |
| 2005/0080722 A1* | 4/2005 | Kemper | G06Q 40/025 | 705/38 |
| 2005/0149421 A1* | 7/2005 | Marlowe-Noren | G06Q 40/00 | 705/35 |
| 2005/0273406 A1* | 12/2005 | Lebda | G06Q 40/00 | 707/999.1 |
| 2005/0289046 A1* | 12/2005 | Conyack, Jr. | G06Q 40/02 | 705/38 |
| 2006/0111945 A1 | 5/2006 | Tinsley et al. | | |
| 2007/0011021 A1 | 1/2007 | Worstell et al. | | |
| 2007/0016519 A1* | 1/2007 | Blount, Jr. | G06Q 10/087 | 705/28 |
| 2007/0050283 A1* | 3/2007 | Freeman | G06Q 40/02 | 705/38 |
| 2007/0050284 A1* | 3/2007 | Freeman | G06Q 40/02 | 705/38 |
| 2007/0050285 A1* | 3/2007 | Freeman | G06Q 40/025 | 705/38 |
| 2007/0142925 A1* | 6/2007 | Heinzmann | G06F 16/24532 | 700/28 |
| 2007/0192237 A1* | 8/2007 | Duoos | G06Q 40/02 | 705/38 |
| 2007/0271177 A1* | 11/2007 | April | G06Q 40/02 | 705/38 |
| 2008/0126267 A1* | 5/2008 | Rosen | G06Q 40/06 | 705/36 R |
| 2008/0243569 A1* | 10/2008 | Hadden | G06Q 30/0216 | 705/14.18 |
| 2008/0249809 A1* | 10/2008 | Rosen | G06Q 40/025 | 705/38 |
| 2009/0228306 A1* | 9/2009 | Izyayev | G06Q 40/02 | 705/4 |
| 2009/0240550 A1* | 9/2009 | McCarty | G06Q 30/0603 | 705/7.13 |
| 2010/0228651 A1* | 9/2010 | Becerra | G06Q 40/025 | 705/30 |
| 2011/0191233 A1* | 8/2011 | Russo | G06Q 40/04 | 705/37 |
| 2012/0278256 A1* | 11/2012 | Williams | G06Q 40/06 | 705/36 R |
| 2013/0263008 A1* | 10/2013 | Bylahalli | G06Q 10/103 | 715/739 |
| 2014/0081672 A1* | 3/2014 | Chawla | G06Q 40/08 | 705/4 |
| 2014/0180907 A1* | 6/2014 | Blank | G06Q 40/025 | 705/38 |
| 2017/0344218 A1* | 11/2017 | Jann | G06F 3/0483 | |

OTHER PUBLICATIONS

EasyMortgageApps, Product Overview, http://easymortgageapps.com/products/product-overview/, Copyright 2016 Easy Mortgage Apps., 4 pages.

* cited by examiner

| | Transaction Type | Transaction Number | Transaction Amount | Date of Transaction | Status |
|---|---|---|---|---|---|
| 612 | Sale | 12345 | $262,000 | 4-03-2015 | Green |
| 614 | Sale | 12322 | $325,000 | 3-14-2015 | Green |
| 616 | Purchase | 12215 | $225,000 | 3-02-2015 | Yellow |
| 618 | Sale | 12163 | $465,000 | 1-15-2015 | Red |

STATUS INFORMATION FOR FINANCIAL TRANSACTIONS

INTRODUCTION

Some financial transactions are complex and involve many steps and specific timing. One example of such a financial transaction is the loan origination process for a mortgage, which is a financial transaction involving the purchase or refinancing of a property such as a home. Other types of financial transactions, such as lines of credit and other loans, are equally complex.

Multiple parties typically participate in such financial transactions. In the context of a mortgage, the parties can include a borrower, a builder, real estate agents, loan officers of a financial institution, etc. Because of this complexity, it can be difficult for the parties to monitor the lifecycle of the financial transaction. Further, communication of such information can be limited because only certain parties have access to the information. This can lead to missed deadlines and a suboptimal experience for the parties.

SUMMARY

Embodiments of the disclosure are directed to an electronic computing device comprising: a processing unit; and system memory, the system memory including instructions which, when executed by the processing unit, cause the electronic computing device to: receive a request from a third party for status information for a financial transaction, the request including an identifier for the third party and an identifier for the financial transaction; authenticate the third party using the identifier for the third party; query a data store using the identifier for the financial transaction to determine the status information for the financial transaction; update any contingency information associated with the financial transaction; and return the status information and contingency information to the third party.

In another aspect, an electronic computing device comprises: a processing unit; and system memory, the system memory including instructions which, when executed by the processing unit, cause the first electronic computing device to: receive a request from a third party organization for status information for one or more financial transactions, the request including an identifier for the third party organization and an identifier for a member of the third party organization that is associated with the one or more financial transactions; authenticate the third party organization using the identifier for the third party organization; identify the one or more financial transactions using the identifier for the member of the third party organization; query a data store for the identified one or more financial transactions to obtain the status information for the one or more financial transactions; and return the status information for the one or more financial transactions to the third party organization.

In yet another aspect, an electronic computing device comprises: a processing unit; and system memory, the system memory including instructions which, when executed by the processing unit, cause the electronic computing device to: receive a request from a third party for status information for a financial transaction involving a mortgage, the request including an identifier for the third party and an identifier for the financial transaction; authenticate the third party using the identifier for the third party; determine an authorization level for the third party using the identifier for the third party; query a data store using the identifier for the financial transaction to determine the status information for the financial transaction; update any contingency information associated with the mortgage, the contingency information including a status of one or more contingent financial transactions, each of the one or more contingent financial transactions involving a sale of property; and return the status information and contingency information to the third party, wherein, a granularity of the status information returned to the third party is dependent upon the authorization level for the third party and wherein the status information includes one or more words, phrases or colors that summarize a status of one or more milestones for the financial transaction.

The details of one or more techniques are set forth in the accompanying drawings and the description below. Other features, objects, and advantages of these techniques will be apparent from the description, drawings, and claims.

DETAILED DESCRIPTION

The present disclosure is directed to providing status information for financial transactions to interested third parties. This information is typically related to complex financial transactions handled by a financial institution. Examples of such financial transactions include loans, such as mortgages and lines of credit.

In these examples, various third parties associated with the financial transaction can automatically obtain information about the financial transaction from the financial institution. In the mortgage context, the third parties can include, without limitation, a borrower, a seller such as a current owner or builder, a load originator, real estate agent(s), and aggregators of real estate information (e.g., Zillow, realtor.com).

In some examples, some third parties, for example real estate agents, can obtain information about their client's financial transactions from a software application on a mobile computing device, for example a smartphone. Many real estate agents belong to a third party industry organization, for example the National Association of Realtors (NAR) and can access a software application associated with the third party organization from the real estate agent's smartphones. The software application can display information for a plurality of financial transactions on the real estate agent's smartphone.

In some examples, the financial transactions that can be viewed are those for a specific financial institution, a financial institution that has an agreement with the third party organization to provide financial transaction information to the third party organization and its members. Other third party organizations, for example bar associations and home builder's organizations, for example the National Association of Home Builders (NAHB), can provide similar types of software applications for their member's smartphones.

Figure 1:
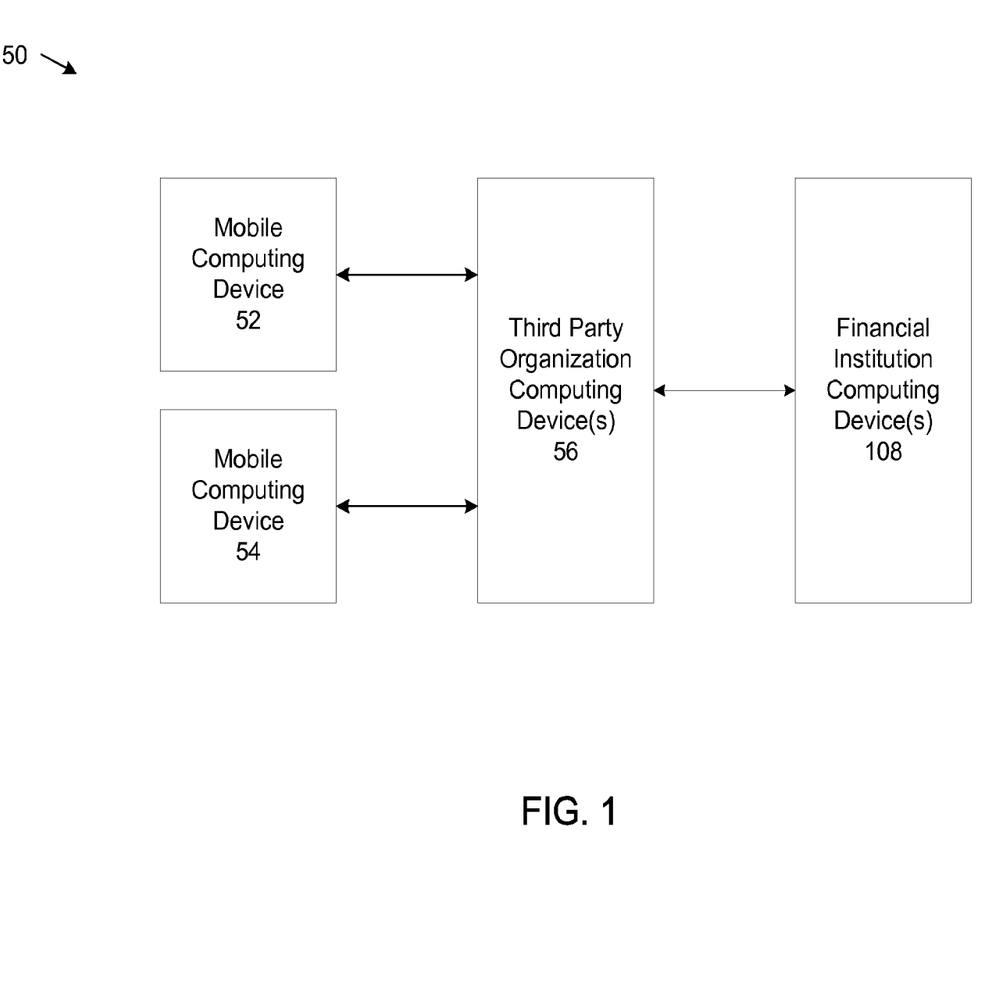
FIG. 1 shows an example system for facilitating a financial transaction.

Referring now to FIG. 1, an example system 50 is shown for providing information about financial transactions to members of a third party organization. In this example, the third party organization is the NAR and the members are realtors. However, as noted the third party organizations can include other types of groups such as bar associations, builder associations and other groups.

The system 50 includes mobile computing devices 52 and 54, third party organization computing devices 56 and financial institution computing devices 108. The mobile computing devices 52 and 54 can include smartphones, tablet computers, etc. for members of the third party organization. In general the mobile computing devices 52 and 54 are personal devices for the members. More or fewer mobile computing devices can be used.

The third party organization computing devices 56 are computing devices for third party organizations such real estate associations, bar association, builder associations, etc. The third party organization computing devices 56 can be desktop computers, server computers, or other computing devices of the third party organization.

It can be common for third party organizations to provide software applications that members can download and install on their mobile devices. For example, the NAR provides a software application that NAR members can install on their smartphones. The software application can permit the NAR members to obtain information that NAR provides to its members. In addition, as discussed above, the software application can include access to status information for financial transactions, for example real estate transactions, for which the members are involved.

The financial institution computing devices 108 are computing devices of financial institutions such as banks, mortgage companies, etc., as discussed in more detail later herein.

The software application permits the third party organization members to obtain information on the financial transactions from the third party organization without the members needing to login to the financial institution computing devices 108 to obtain this information. This creates efficiencies for the third party organization members, because the members do not need a separate software application for their smartphone to obtain the financial information. The members can use a software application that they are already have and are already using.

Other efficiencies can be applied to the financial institution and to the financial institution computing devices 108. Instead of needing to notify each person associated with a financial transaction when the status of the financial transaction changes, the financial institution can only notify the third party organization. The third party organization can then notify the appropriate members of the third party organization of the status changes.

Another benefit to the financial institution is that the financial institution does not need to manage the members of the third party institution or keep track of any personal information for these members. This kind of detail can be handled by the third party organization. The financial institution only needs to identify members of the third party organization and provide financial status information for financial transactions associated with each member.

One way in which the financial organization can identify the members of the third party organization is to associate unique identifiers with each member. When the financial institution notifies the third party organization of a status change to a financial transaction, the financial institution can obtain the unique identifier for each member of the third party organization associated with the financial transaction. The unique identifier of each member associated with the financial transaction can be sent to the third party organization along with the status information. When the third party organization receives the status information, the third party organization can use the identifier to identify the member and to send the status information to the member. Similarly, when the financial institution receives a request for status information from the third party organization, the request can include the unique identifiers for all members for which status information for the financial transactions associated with the members is to be obtained. The financial institution can then provide status information for all members corresponding to the unique identifiers and send the status information to the third party organization.

In one example, the third party organization may have a relationship with the financial institution such that the third party organization can access financial transaction information for its members. As discussed, in more detail later herein, a member of the third party organization can view a display of financial transactions associated with the member at the third party organization. The member can select one or more financial transactions and display status information for the one or more financial transactions.

Figure 2:
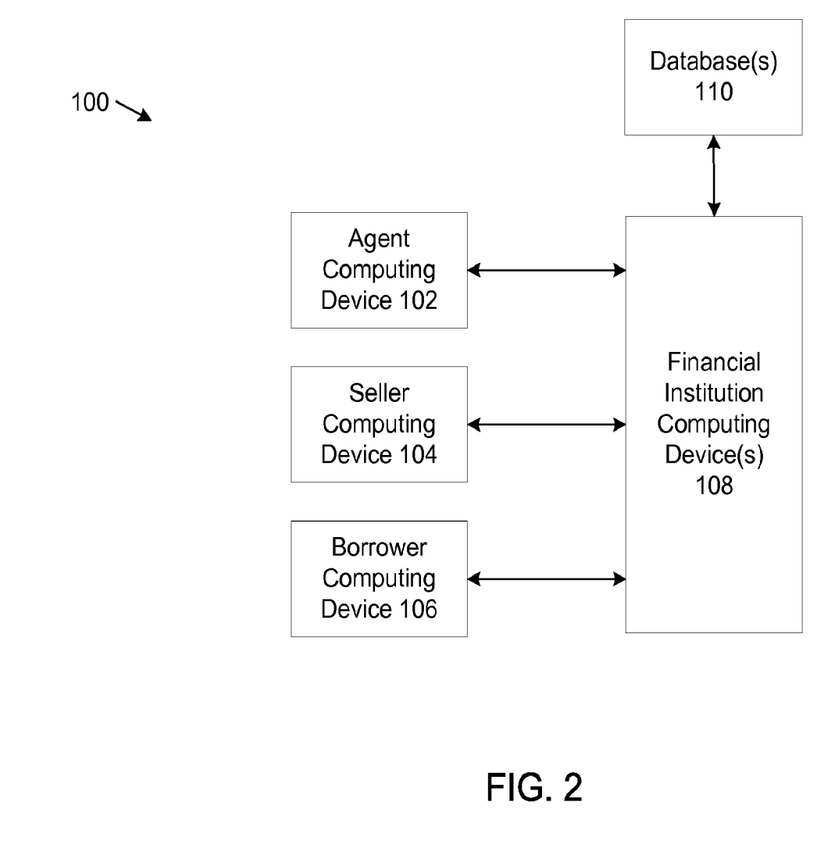
FIG. 2 shows another example system for facilitating a financial transaction.

Referring now to FIG. 2, an example system 100 is shown for facilitating financial transactions. In this example, one financial transaction is the origination for a mortgage facilitated by a financial institution, such as a bank. However, as noted, the financial transactions can be a myriad of other types of financial transactions, such as lines of credit, etc.

The system 100 includes financial institution computing devices 108. The financial institution computing devices 108 are typically a group of computers (e.g., a server farm) that facilitates the loan origination process for a mortgage. Generally, the origination process involves the processing of an application for a loan of money to be used for the purchase or refinance of a property such as a home.

The financial institution computing devices 108 communicate with one or more databases 110. The databases 110 include financial information about the origination process. An example of this information includes a borrower's bibliographic information (e.g., name, contact address, etc.), financial information (e.g., salary, savings, etc.), and property information (e.g., location, sales price, etc.). This type of information can be maintained by the financial institution.

In addition, the databases 110 can include information provided by parties external to the financial institution. Examples of such information include federal interest rates and information associated with certain contingencies associated with the mortgage.

One example of such a contingency is information related to the sale of another property that acts as a contingency for a particular mortgage. It is typical for a borrower to have a mortgage be made contingent on the sale of the borrower's current property. Examples of other such contingencies include an appraisal at a required amount, and the completion and acceptance of a property inspection.

The financial institution computing devices 108 communicate with the databases 110 to process the loan origination and provide information to various parties throughout the process. For example, an agent computing device 102, a seller computing device 104, and a borrower computing device 106 all communicate with the financial institution computing devices 108 to obtain information about the origination process. In these examples, the financial institution computing devices 108 provides status updates to the agent computing device 102, the seller computing device 104, and/or the borrower computing device 106, as described below. The computing devices 102, 104, 106 can be any type of computer, such as a desktop, laptop, tablet, or mobile telephone.

Figure 3:
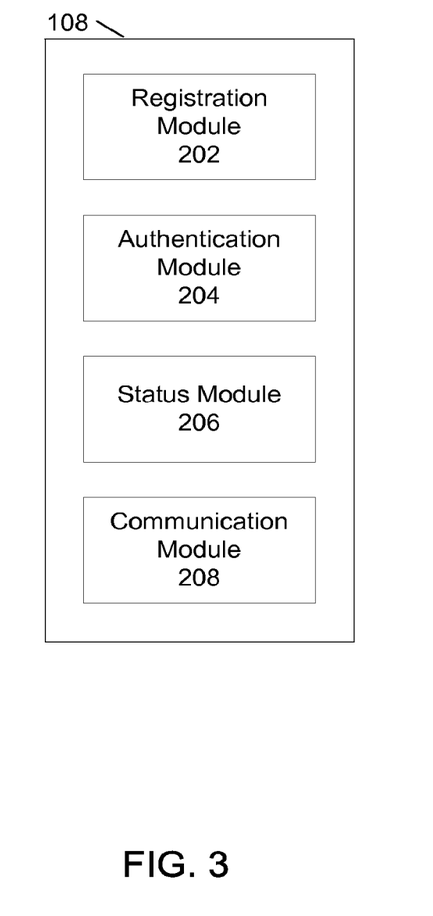
FIG. 3 shows example logical modules of one or more financial institution computing devices of the system of FIG. 1.

Referring now to FIG. 3, example logical modules of the financial institution computing devices 108 are depicted. These modules include a registration module 202, an authentication module 204, a status module 206, and a communication module 208. These logical modules are specific organizations of software source code that accomplish specialized and complex tasks in an efficient manner. The source code can be complied and executed by one or more processing units (see FIG. 8) of the financial institution computing devices 108. In a typical implementation, the execution of these modules can be distributed across multiple computing devices of the financial institution computing devices 108.

The registration module 202 is programmed to register a third party who wishes to obtain information about a mortgage. In the examples provided, the third party can be a real estate agent (accessing the financial institution computing devices 108 using the agent computing device 102), a seller of a property (accessing the financial institution computing devices 108 using the seller computing device 104), and/or a borrower (accessing the financial institution computing devices 108 using the borrower computing device 106).

Information associated with the financial transaction is often confidential. To assure access to the confidential information is restricted, the registration module 202 restricts the third parties who can register with the financial institution computing devices 108 and the information provided to the third parties.

In one example, the financial institution computing devices 108 maintains one or more records associated with a financial transaction in the databases 110. This record includes such information as details about the financial transaction and a list of third parties associated with the transaction. One example of such a Record A is provided below.

| Transaction Type | Transaction Number | Transaction Amount | Date of Transaction | Status | Third Party 1 | Third Party 2 | Third Party n |
|---|---|---|---|---|---|---|---|

In this record, the example fields associated with the details about the transaction include transaction type (e.g., mortgage), transaction number (e.g., a unique number assigned to the transaction), transaction amount (e.g., the total amount of the mortgage), date of transaction (e.g., date mortgage will be paid), and status (e.g., where the transaction is within the lifecycle, as described further below). In addition, the record stores bibliographic information about the third parties associated with the transaction (i.e., third party 1, third party 2, third party n). In the mortgage context, these third parties can include the borrower, the seller, the builder, and the real estate agent(s).

In some examples, the borrower can provide consent before other third parties (e.g., real estate agent(s) and/or builders) can access information associated with the loan origination process. This access can be tailored based upon who the third party is, as described below.

The registration module 202 of the financial institution computing devices 108 can access the third party information from the record (i.e., third party 1, third party 2, third party n) when a third party attempts to register with the financial institution computing devices 108. For example, the third party can provide the third party's name and the desired transaction number. The financial institution computing devices 108 accesses the record associated with the transaction number and determines if the third party matches one of the third parties in the record that has been granted access. If so, the registration module 202 creates an example Record B for the individual including one or more of the following fields.

| User Identification | Contact Information | Access Type | Transaction Number |
|---|---|---|---|

The user identification field of the record includes a user name for the third party. The contact information field includes information on how the third party can be contacted (e.g., email address or text message number so that status information about the financial transaction can be provided, as described below). The access type field defines the type of information that is returned to the third party about the financial transaction. For example, the access type can indicate if the third party is a borrower, seller, builder, or real estate agent. Depending on the access type, different information is returned to the third party, as described below.

The record can also include an identifier (e.g., transaction number) of the financial transaction to which the third party is associated. In some examples, the third party can be associated with more than one financial transaction. For example, a real estate agent can be associated with multiple loan originations held by the financial institution within the financial institution computing devices 108. In such an example, the record associated with the real estate agent can include multiple transaction numbers.

In another example, the financial institution computing devices 108 can associate group numbers with individuals, and each group number can be associated with two or more records. For example, a group number can be associated with a real estate firm, and each mortgage handled by the real estate agents of that real estate firm can be associated with a group number. The record for each real estate agent can thereupon also be associated with the group number so that the real estate agents each have access to the mortgages serviced by the real estate firm.

In some examples, the registration module 202 is programmed to send out invitations to one or more of the third parties associated with the Record A. For example, if a real estate agent is entered into the financial institution computing devices 108 and associated with a given record, an invitation (e.g., by the communication module 208) can be generated to provide the real estate agent with information on how to register with the system 100 to receive the status information about the mortgage.

The authentication module 204 authenticates third parties as the third parties access the financial institution computing devices 108. As an example, the authentication module 204 can use a digital certificate in the request to authenticate the third party, although other methods of authentication can be used. The authentication module 204 then identifies a member of the third party that is making a request for information from the financial institution computing devices 108. A determination is made as to whether the member is authorized to have access to the financial institution computing devices 108, and when the member is authorized, an access level for the information is determined for the member. However, in this example, the authentication module 204 does not authenticate the member of the third party. Instead, the member of the third party can be authenticated by the third party. In this example, one or more of the computing devices 102, 104, 106 can generate the request for information from the financial institution computing devices 108. In such a request, the following example information can be included.

| Request Type | User Identification | Transaction Number |
| --- | --- | --- |

The authentication module 204 can also authenticate individuals as the individuals directly access the financial institution computing device 108. As an example, a user ID and password can be used to authenticate the individuals. As shown in FIG. 2, individual agents, sellers and borrowers can directly access the financial institution computing devices 108. The agents, sellers and borrowers can use one or more of the computing devices 102, 104 and 108 to make a request for information from the financial institution computing devices 108. The request can include a request type, user identification and transaction number, as shown above.

The example request can include a request type, which is the type of request made by the computing devices 102, 104, 106. This can be, for example, a request for the status of a particular financial transaction. The request can also include a user identification that identifies the third party. This can include the third party's unique identifier and password. Finally, the request can include the transaction number for the financial transaction.

The authentication module 204 accesses information in the Record B to authenticate the third party. For example, the authentication module 204 confirms that the user identification matches the information in the Record B. In addition, the authentication module 204 confirms that the transaction number in the request matches one of the transaction numbers in the Record B for the third party. If both match, the third party is authenticated. If not, the authentication fails, and the third party is not provided with the requested information by the financial institution computing devices 108.

The status module 206 determines the status information for the financial transaction at a given point in time. This status information includes, for example, determining the point in the lifecycle at which the mortgage stands, as described below. The milestones tracked by the system can vary depending on the type of financial transaction. For loan originations for mortgages, such milestones include: receipt of loan application; receipt of financial status information; property inspection; appraisal; underwriting of loan; approval; closing. The status information can also include the statuses of any contingencies associated with the mortgage.

The status information can be updated in near real time. For example, as the mortgage moves through the mortgage process, the status within the lifecycle is updated. The status information can also be updated periodically. For example, the status module 206 can be programmed to access one or more external databases at periodic intervals (e.g., once per hour, once per day, once per week) to determine the status of certain contingencies. The status module 206 updates the status field in the Record A.

The communication module 208 of the financial institution computing devices 108 is programmed to communicate status information to third parties for a financial transaction. In this example, the status information can include at where in the lifecycle the mortgage is currently, along with information associated with any contingencies. Such a communication can look as follows.

| Contact Information | Transaction Number | Status Information |
| --- | --- | --- |

The contact information is the information needed to contact the third party, such as the third party's email or text message number. The transaction number is the number associated with the financial transaction, and the status is the status information from the Record A. This status information is described further below.

In some examples, the communication module 208 communicates with the third party via email or text message. In other examples, the communication module 208 communicates with an application running on the computing devices 102, 104, 106.

The communication module 208 can provide the information in a format such that the third party can incorporate the data into the third party's typical workflow. For example, if the third party is a real estate agent, the communication module 208 can communicate with the real estate agent's existing software systems to provide the status information. In this manner, the real estate agent can receive and assimilate the data in a meaningful manner.

In some examples, the communication module 208 pushes information to the third party at periodic intervals. For example, the communication module 208 can be programmed to push status updates to the third party on a periodic or near real time basis as the status updates occur. For example, as the mortgage changes status during the lifecycle, each lifecycle event can be pushed by the communication module 208 to each third party associated with the financial transaction. In addition or alternatively, the communication module 208 can simply return information on a pull basis when such information is requested by the third party, as noted above.

Figure 4:
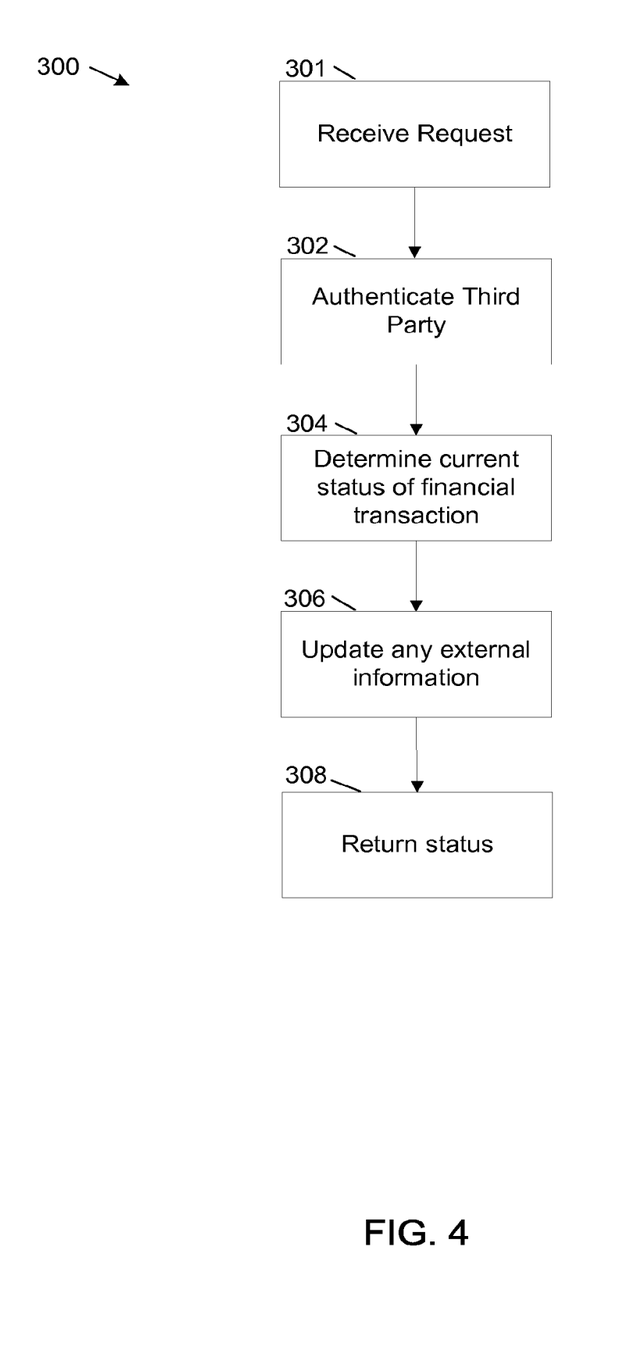
FIG. 4 shows an example method for providing status information for a financial transaction.

Referring now to FIG. 4, an example method 300 for providing status information about a financial transaction is provided. As noted, many different types of financial transactions can be addressed. The example method 300 will be described in the context of the origination of a mortgage.

At operation 301, a request for status information related to a mortgage is received from a third party. In some examples, this request can come from various disparate sources outside the financial institution, as noted. This request can include metadata that identifies the originator of the request, as well as the particular information being sought.

At operation 302, the third party making the request is authenticated. This can be in conjunction with a request for status information, as described above. As noted, the authentication is accomplished by the authentication module 204 using the Record B associated with the user making the requested. If authentication is successful, control is passed to operation 304. If not, an error message can be returned, and the method 300 terminates.

If the third party is authenticated, control is passed to operation 304, at which a determination is made as to the current status of the mortgage. This can be accomplished, for example, by querying the database to obtain the status in the Record A. In some implementations, this status information can be updated by the status module when such a request is made.

In conjunction with determining the status information, any external information associated with the mortgage is updated at operation 306. This can include, for example, querying one or more external databases to determine the status of certain contingencies associated with the mortgage.

For example, the mortgage may be made contingent on the borrower selling the borrower's current property. The information associated with that property may be held by the same financial institution or a separate financial institution. If the same financial institution services the property associated with the contingency, information can be updated by internal queries to the record associated with the contingent property.

For instance, assume a buyer is purchasing house A and the purchase is contingent on the sale of house B. A third party (e.g., real estate agent, builder, etc.) can monitor the status of the sale for the owner of house A. The level of detail provided for the contingent loan may depend on whether the buyer and/or owner of house B has granted permission for third party monitoring of the status of the mortgage associated with house B.

In yet a further instance, assume that buyer of house B also has a contingency on selling house C. A third party can have access to loan status information for houses A, B, and C, making it easy for the third party to get a good estimate of timelines until closing for the mortgage associated with any of houses A, B, and C.

If a separate financial institution handles the contingent property, the financial institution computing devices 108 can query the external sources of information to determine the status of any such contingencies and return such information, as describe below. However, as noted, some contingencies may not be external, in that, for example, a contingency to sell an existing property may be handled by the same financial institution, so that an external query is unnecessary to determine the status of the contingency.

After the status information, including any external status information is identified and/or updated, control for the method 300 is passed to operation 308, and the status information is returned to the third party. As noted, this information can be returned in a variety of formats.

The content of the status information that is returned can be tailored to the third party based upon the access type field in the Record B. This access type defines what types of information the third party can access on the financial institution computing devices 108.

For example, a borrower can receive information about the current status within the timeline for the mortgage, from the start of the loan origination process through to closing. The borrower can also receive more detailed financial information associated with qualifying the borrower for the mortgage, such as salary information, etc. for the borrower that has been provided to the financial institution computing devices 108.

The seller, on the other hand, would not receive detailed financial information about the borrower. Instead, the seller can receive information such as the current status within the timeline for the mortgage and information related to any contingencies.

Yet other third parties can receive even more generic information. For example, a builder can receive only cursory status information, such as: "awaiting W2," "sent to underwriting," "awaiting appraisal," "appraisal supports transaction," "three days to close," etc. Other configurations are possible.

Figure 5:
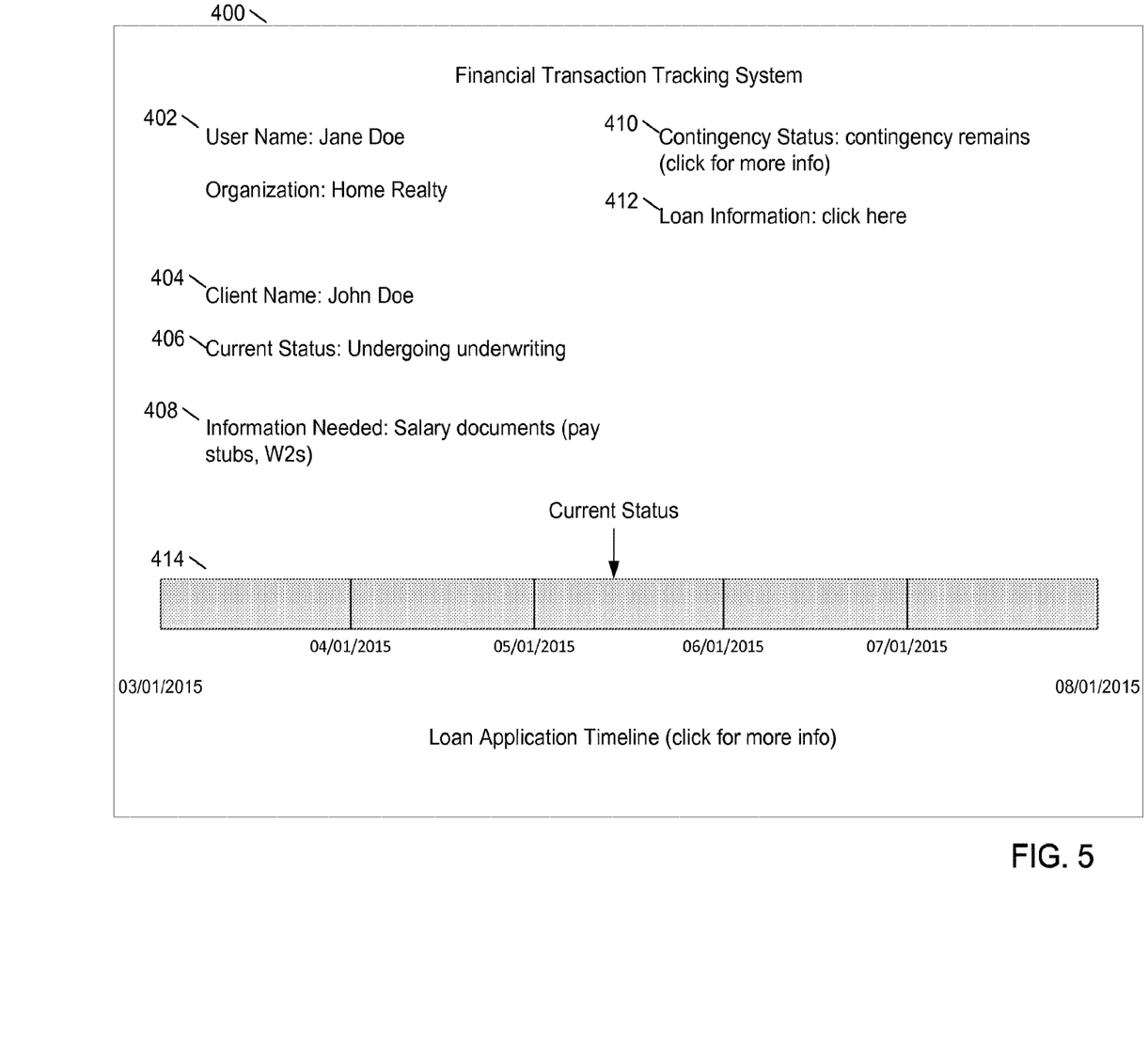
FIG. 5 shows an example graphical user interface providing status information for a financial transaction.

Referring now to FIG. 5, an example graphical user interface 400 is shown that provides status information about a financial transaction on the computing device 102 for a real estate agent. In one example, the graphical user interface 400 is provided within by application running on the computing device 102. In another example, the graphical user interface 400 is accessed through a web browser. In yet other examples, similar information can be provided using other communication schemes, such as through email and/or text messaging.

The graphical user interface 400 includes user identifier fields 402 that identify the current third party by user name and affiliation (e.g., real estate firm), if applicable. A field 404 identifies the client name, which is typically the borrower for the loan in the context of the borrower's real estate agent, or the seller in the context of the seller's real estate agent.

Fields 406 and 408 provide status information about the mortgage origination process. The field 406 provides the current status in the timeline for the mortgage (e.g., undergoing underwriting), and the field 408 indicates if anything is currently due (e.g., salary documents are needed from the borrower).

In addition, in this example, a timeline 414 of the mortgage process is depicted in a visual format. The timeline 414 typical starts when the loan origination process started and ends at closing. Various milestones can be provided on the timeline therebetween, and the current status of the mortgage is shown. Features such as color-coding can indicate if the process is on-schedule (e.g., green) or behind-schedule (e.g., red). For example, each milestone can include a status (e.g., pending, completed, and/or delinquent) with coding to indicate the same.

At field 410, the status of any contingencies is provided. In this example, the field 410 indicates that a contingency remains, and the user can click for more information. In other examples, the contingency information can be provided on the graphical user interface 400. In yet other embodiments, visual indicates (e.g., color and/or icons) can also be used to indicate the status of contingencies (e.g., green to indicate none and red to indicate one or more exists). The real estate agent can click at field 412 to obtain more information about the mortgage, such as amount, type, etc.

Other graphical user interface configurations can be provided to convey other information to third parties. For example, as noted above, a real estate firm may be servicing a plurality of mortgages with the financial institution. An interface can be provided to allow the real estate agent(s) with the firm see the status of all or a subset of those mortgages in one or more interfaces. Filtering of those mortgages can also be provided, such as allowing the real estate agent to filter the results to show those mortgages including contingencies that are outstanding. Many other configurations are possible.

The information presented by the graphical user interface 400 can be updated in near real time so that the latest information is presented to the third party. In another example, the data presented on the graphical user interface 400 can be cached on the computing device should the computing device be taken offline. In such a scenario, the data can be updated (e.g., at periodic intervals) once connectivity is reestablished.

The graphical user interface 400 provides an efficient manner in which the third party can obtain status information for the financial transaction. This efficiency translates both to the third party and the computing devices. By allowing the third party to obtain such information in this manner reduces the amount of effort that is required. In addition, this results in greater efficiency for the financial institution and the computing devices because the financial status information can be served to third parties in an efficient manner as opposed to requiring manual processes to obtain such information.

Figure 6:
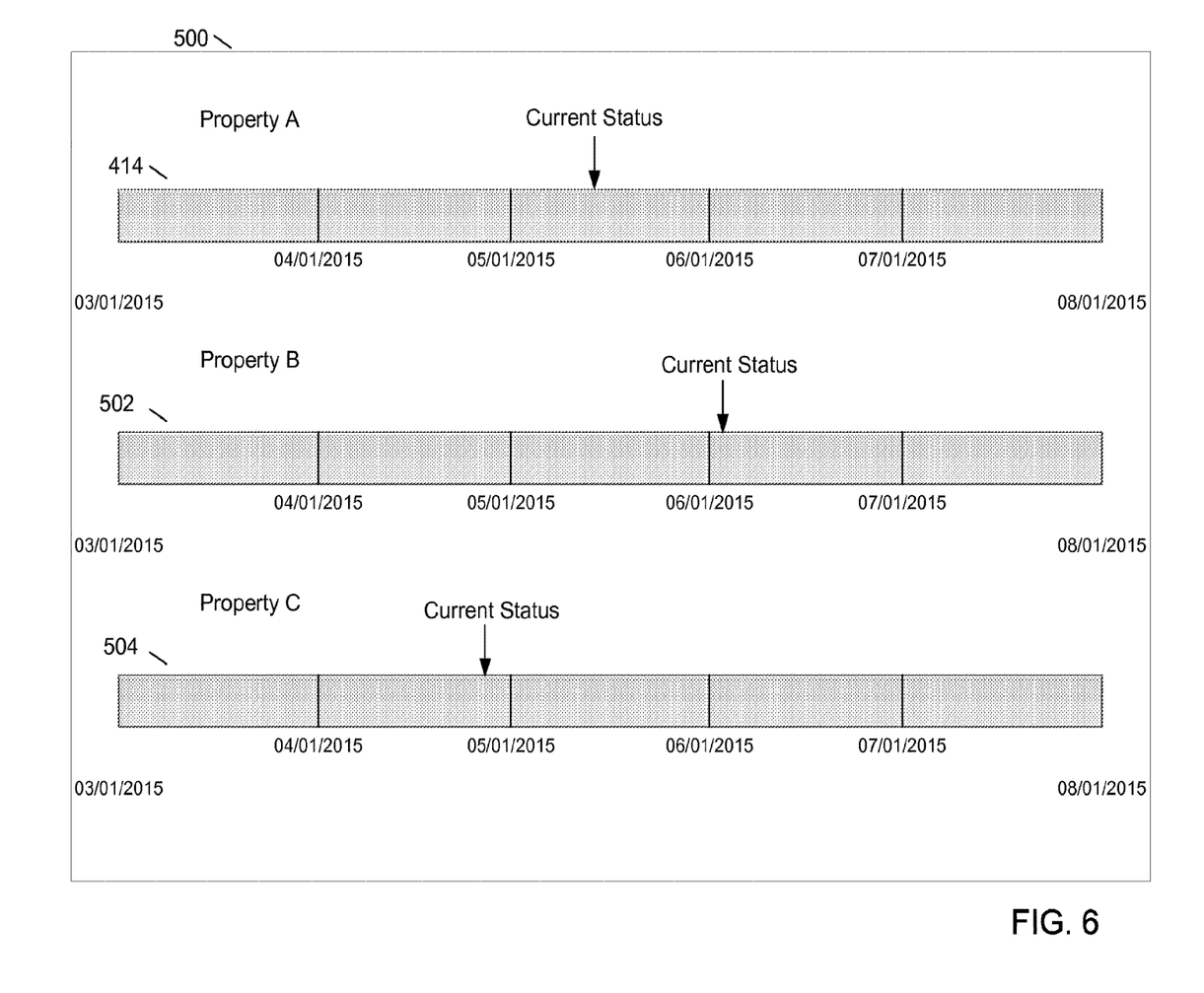
FIG. 6 shows another example graphical user interface providing status information for a financial transaction.

Referring now to FIG. 6, an example graphical user interface 500 is shown that provides contingency status information about a financial transaction on the computing device 102 for third party, such as a real estate agent. The graphical user interface 500 is displayed when the third party clicks at contingency status field 410 on the graphical user interface 400 to request more information regarding a status of any contingencies for the financial transaction. The graphical user interface 500 is described for the case when the third party is a real estate agent.

FIG. 6 shows timelines for each property associated with the financial transaction for which there is a contingency. Each timeline is shown with the same starting and ending dates so that the real estate agent can see a current status for each property in relation to each other. Property A is the property for which a mortgage is to be obtained. Timeline 414 for property A is duplicated from FIG. 5. For the example graphical user interface 500, completing the sale of property A is contingent on completing a sale of property B, which in turn is contingent on completing the sale of property C. This is because the buyer of property A needs to complete a sale of property B to obtain enough funds for a down payment of property A and the buyer of property B needs to complete a sale of property C to obtain enough funds for a down payment of property B.

As discussed earlier herein, various milestones can be completed on the timeline therebetween, and the current status of the mortgage is shown. As shown in FIG. 6, property B is closer to closing than property A, but property C is farther from closing than either property A or property B. The relationship of the statuses of properties A, B and C and other visual information, such as color-coding, can alert the real estate agent to problems with one or more of the properties and can permit the real estate agent to take additional action.

Figure 7:
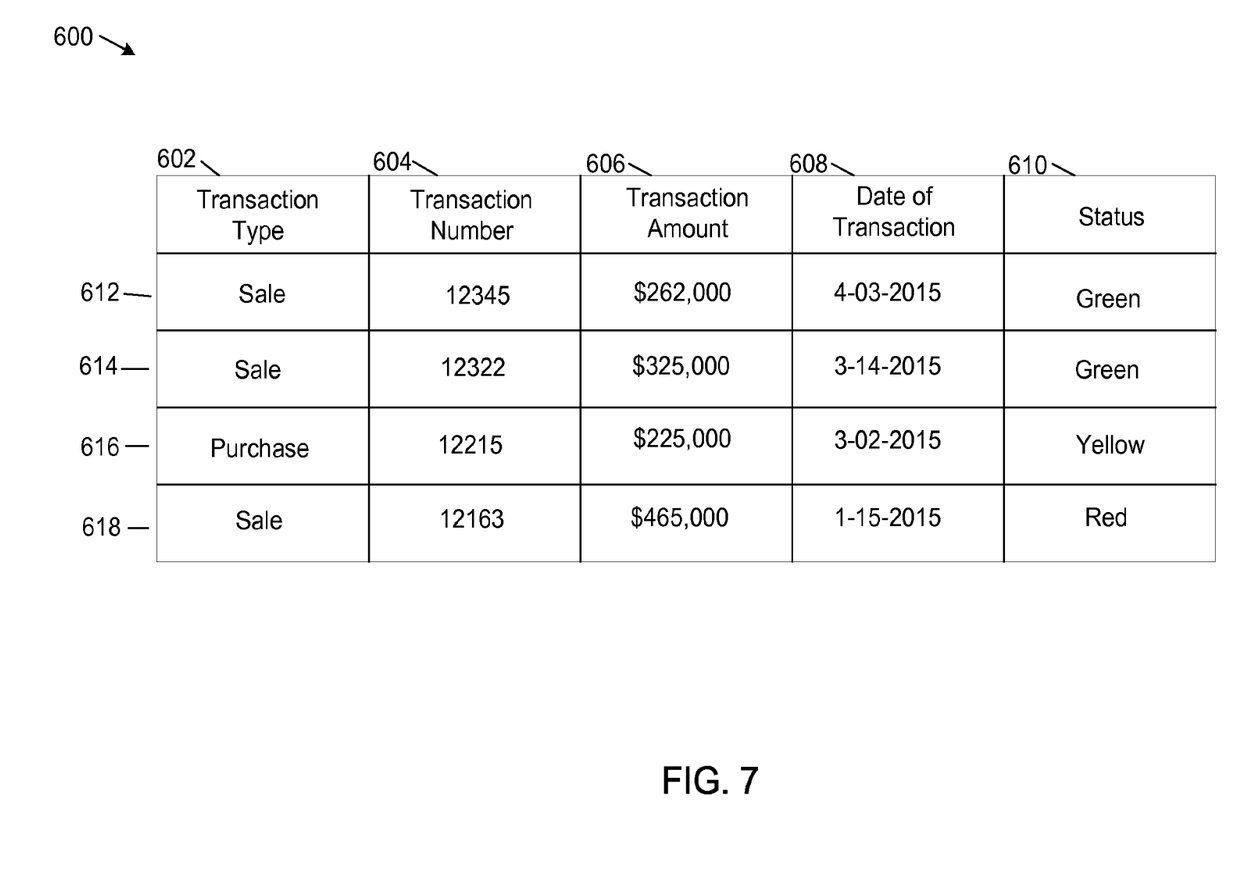
FIG. 7 shows a graphical user interface providing status for a plurality of financial transactions.

FIG. 7 shows an example graphical user interface 600 that can be displayed on a mobile computing device, for example on mobile computing device 52. The graphical user interface 600 is displayed when a third party, for example a real estate agent, selects a tab on a software application activated on the real estate agent's smartphone. The software application is one made available to the real estate agent from a professional organization such as the NAR.

The NAR has an arrangement with a financial services company in which the NAR can access financial transaction information at the financial services company for NAR members. The financial transaction information can be displayed to an appropriate NAR member (e.g., to the real estate agent that is associated with the financial transactions) when the NAR member selects the tab on the software application. The NAR member is identified and authenticated to view the financial transaction information when the NAR member logs in to the software application.

As shown in FIG. 7, the graphical user interface 600 displays a table showing information for financial transactions associated with the real estate agent for a specific financial institution. As discussed earlier herein, the specific financial institution has a relationship with a third party organization, for example the NAR, to provide status information to the financial institution for members of the financial institution. The table includes columns 602-610 for transaction type, transaction number, transaction amount, date of transaction and status, respectively. A separate row is displayed for each financial transaction associated with the real estate agent. For the example shown in FIG. 7, four rows (612-618) are shown, corresponding to four financial transactions associated with the real estate agent. Columns 602-610 correspond to fields in a record for a financial transaction, as discussed earlier herein.

For the financial transactions associated with the real estate agent, the transaction type is shown to be either sale or purchase, corresponding to a sale or purchase of a home. Other transaction types, for example mortgage, can be used. The status column corresponds to an overall status of the financial transaction, indicating whether the financial transaction is on schedule or not. For the example shown in FIG. 7, the overall status is indicated by a name of a color, where a green indicates that the financial transaction is on schedule, yellow indicates that there may be a problem in meeting the schedule and red indicates that there is a problem and the financial transaction is behind schedule. The overall status can also be indicated by a percent completion rate, wherein closing on the property corresponds to 100% completion.

For other examples, more detailed status information can be given. For example, when a status indicates that there is problem or that there may be a problem, a reason for the problem or potential problem can be given. Some example reasons can be that there is a delay in submitting financial documents or that there is a delay in obtaining a property assessment. Other reasons are possible. In some examples, a granularity for the status information can depend on an authorization level for a member of a third party organization. For example, realtors may able to obtain more detailed status information than builders or attorneys.

In many cases, when a financial transaction involving buying or selling a home is behind schedule, there may be a problem with a contingency financial transaction. As discussed earlier, in order for one financial transaction to be completed, one or more other financial transactions, generally involving a sale of additional property and/or the closing of one or more mortgages, may need to be completed. The real estate agent can view a timeline of each financial transaction shown in FIG. 7 by selecting a row for the financial transaction and initiating a display of the timeline. In one example, the real estate agent can initiate the display of the timeline by double clicking on the selected row with a mouse. Other ways to initiate the display of the timeline are possible.

When the real estate agent initiates the display of the timeline for the financial transaction, in one example a timeline similar to that shown in FIG. 6 is displayed. The timeline can show any contingencies involved in the financial transaction and can show a status for each contingent financial transaction. In addition, in another aspect, the financial institution can pull in specific information from third parties and display this information on the timeline. For example, the financial institution can obtain property valuations from a third party organization like Zillow and display the property valuations on the timeline.

The systems and methods also permit both push and pull communications. That is, in addition to providing access to a software application on a smartphone, the systems and methods permit status alerts and notifications to be sent from the third party organization to a third party. For example, the NAR can send an alert to a real estate agent when a milestone in a financial transaction is reached. Example milestones can include a property inspection, an approval of a mortgage, a closing on one or more properties that are contingencies in the financial transaction, etc. Other milestones are possible. As another example, the NAR can send a notification to the real estate agent when certain events occur or are about to occur. For example, the NAR can send a notification to the real estate agent when a home is ready for closing. The alerts and notifications can take the form of a text message, an email message or other communication.

Figure 8:
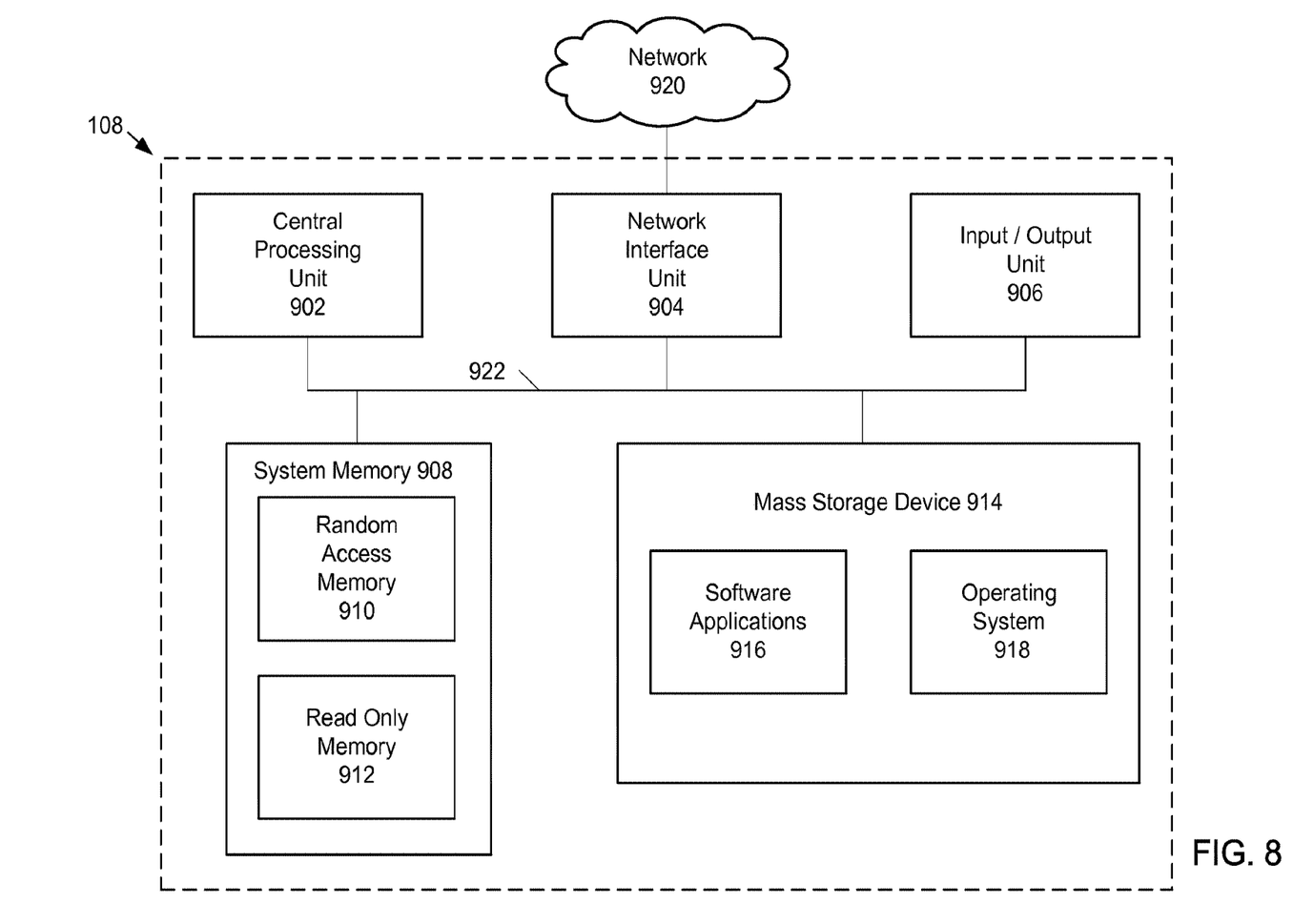
FIG. 8 shows example components of one of the financial institution computing devices of FIG. 1.

As illustrated in FIG. 8, one example of the financial institution computing devices 108 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the financial institution computing device 108, such as during startup, is stored in the ROM 912. The financial institution computing device 108 further includes a mass storage device 914. The mass storage device 914 is able to store software instructions and data.

The mass storage device 914 is connected to the CPU 902 through a mass storage controller (not shown) connected to the system bus 922. The mass storage device 914 and its associated computer-readable data storage media provide non-volatile, non-transitory storage. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution computing device 108.

According to various embodiments of the invention, the financial institution computing device 108 may operate in a networked environment using logical connections to remote network devices through the network 920, such as a wireless network, the Internet, or another type of network. The financial institution computing device 108 may connect to the network 920 through a network interface unit 904 connected to the system bus 922. It should be appreciated that the network interface unit 904 may also be utilized to connect to other types of networks and remote computing systems. The financial institution computing device 108 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the financial institution computing device 108 can store software instructions and data. The software instructions include an operating system 918 suitable for controlling the operation of the financial institution computing device 108. The mass storage device 914 and/or the RAM 910 also store software instructions, that when executed by the CPU 902, cause the financial institution computing device 108 to provide the functionality of the financial institution computing device 108 discussed in this document. For example, the mass storage device 914 and/or the RAM 910 can store software instructions that, when executed by the CPU 902, cause the financial institution computing device 108 to display received data on the display screen of the financial institution computing devices 108.

Other financial institution computing devices 108 and computing devices 102, 104, 106 can be configured in a similar manner.

As previously noted, the examples described herein are provided in the context of the mortgage origination process. However, the disclosure is equally applicable to other types of financial transactions including, for example, lines of credit. For these types of financial transactions, the systems and methods are used to provide similar status information to third parties.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
   a processing unit; and
   system memory, the system memory including instructions which, when executed by the processing unit, cause the electronic computing device to:
      receive status information regarding a financial transaction for a member of a third party organization;
      receive contingency information regarding the financial transaction;
      associate the status information and the contingency information with an identifier for the third party organization;
      update a data store with the status information and the contingency information; and
      periodically query the data store and return the status information and the contingency information to the third party organization.

2. The electronic computing device of claim 1, further comprising returning the status information and the contingency information to the third party organization when the electronic computing device receives the status information and the contingency information.

3. The electronic computing device of claim 1, wherein the contingency information includes information regarding two or more properties involved in the financial transaction, a sale of one or more of the two or more properties being contingent on a sale of another of the two or more properties.

4. The electronic computing device of claim 1, wherein the status information includes a timeline for a sale of two or more properties.

5. The electronic computing device of claim 1, wherein the status information includes a word, phrase or color that indicates an overall status of the financial transaction.

6. The electronic computing device of claim 1, wherein the instructions further cause the electronic computing device to periodically send additional status information to the third party organization, the additional status information including identifiers for each member of the third party organization that is associated with financial transactions corresponding to the status information.

7. An electronic computing device, comprising:
a processing unit; and
system memory, the system memory including instructions which, when executed by the processing unit, cause the electronic computing device to:
receive a request from a third party for status information for a financial transaction involving a mortgage, the request including an identifier for the third party and an identifier for the financial transaction;
authenticate the third party using the identifier for the third party;
determine an authorization level for the third party using the identifier for the third party;
query a data store using the identifier for the financial transaction to determine the status information for the financial transaction;
update any contingency information associated with the mortgage, the contingency information including a status of one or more contingent financial transactions, each of the one or more contingent financial transactions involving a sale of property; and
return the status information and the contingency information to the third party,
wherein, a granularity of the status information returned to the third party is dependent upon the authorization level for the third party and wherein the status information includes one or more words, phrases or colors that summarize a status of one or more milestones for the financial transaction.

8. The electronic computing device of claim 7, further comprising returning the status information and the contingency information to the third party when the electronic computing device receives the status information and the contingency information.

9. The electronic computing device of claim 8, wherein the contingency information includes information regarding two or more properties involved in the financial transaction, a sale of one or more of the two or more properties being contingent on a sale of another of the two or more properties.

10. The electronic computing device of claim 9, wherein the status information includes real estate transactions for the financial transaction.

11. The electronic computing device of claim 7, wherein the contingency information includes a status of the one or more contingent financial transactions.

12. The electronic computing device of claim 11, wherein the financial transaction is contingent upon obtaining the mortgage on a home.

13. The electronic computing device of claim 7, wherein the instructions further cause the electronic computing device to periodically send updated status information regarding the financial transaction to the third party.

14. The electronic computing device of claim 7, wherein the request from the third party is from a member of the third party.

15. The electronic computing device of claim 14, wherein the third party has an agreement with a financial institution to obtain, from the financial institution, status information for financial transactions of members of the third party.

16. The electronic computing device of claim 7, wherein the electronic computing device is of a financial institution and wherein the third party is one or more of a customer of the financial institution, a realtor or an attorney.

17. A computer-implemented method capable of obtaining status information for financial transactions, comprising:
receiving, by an electronic computing device, status information regarding a financial transaction for a member of a third party organization;
receiving contingency information regarding the financial transaction;
associating the status information and the contingency information with an identifier for the third party organization;
updating a data store with the status information and the contingency information; and
periodically querying the data store and return the status information and the contingency information to the third party organization.

18. The method of claim 17, wherein the electronic computing device is of a financial institution, and wherein the third party organization is one of a bar association and a builder association.

19. The method of claim 18, wherein the third party organization has a relationship with the financial institution such that the third party organization can access financial transaction information for its members.

20. The method of claim 17, wherein the contingency information is an appraisal at a required amount and completion and acceptance of a property inspection.

* * * * *